April 30, 1940.  M. HAGENES  2,198,667
SPORT VEHICLE
Filed Nov. 23, 1938

Inventor
Magnus Hagenes
by Augustus M. Henry
Atty

Patented Apr. 30, 1940

2,198,667

UNITED STATES PATENT OFFICE 2,198,667

SPORT VEHICLE

Magnus Hagenes, Brooklyn, N. Y.

Application November 23, 1938, Serial No. 241,926

2 Claims. (Cl. 280—87.04)

This invention relates to wheeled vehicles.

More particularly, the invention provides a novel such vehicle of the type for carrying a rider balanced upright on one foot thereon so that propulsion of the vehicle is effected by thrusts of his other foot against the ground.

The new vehicle of the present invention may be said to be in the class of so-called scooters; although differing markedly from the ordinary scooter in regard to the kind and degree of skill required to operate and control the vehicle.

The aim of the present invention is to provide a sport-serving vehicle of the foot propulsion kind as above and one steerable not only in a novel manner but in a manner to challenge intriguingly the skill of the rider.

In the ordinary scooter as previously made, steering is effected, according to the type of construction employed, in either one of two ways, but always by moving the plane of rotation of the front wheel relative to the plane of rotation of the rear wheel. In one case, the front wheel is journalled on a mount swivelled on a vertical axis and connected to the lower end of an upwardly and rearwardly inclined steering rod or tiller. In the other case, the front wheel is attached to a rubber block or pad, so that lateral thrust of the ground engaging foot of the rider causes the front wheel to act steeringly by tilt thereof incidental to compression of a part of said block.

In the vehicle of the present invention, essentially, the wheel equipment is such as to include a rear wheel and a front wheel both of which are so journalled on the chassis or carriage as to be always held to planes of rotation to hold the vehicle definitely to a straight-line path of travel only; and the vehicle is steered for change of direction, either a gently curving one or one which is very abrupt, by exerting a lifting pull on a forward point along the chassis to relieve the front wheel of ground grip, and by swinging the chassis horizontally, during the period of such relief, about a point of contact between the bottom of the rear wheel and the ground. At first attempts, steering of the vehicle according to this principle appears most difficult; but with more and more practice, greater and greater skill is developed, and greater and greater interest in both individual travel and competitive events is aroused.

As the invention has been actually put in practice, the steering means includes an elongate flexible element fastened at its lower end to a forward point on the chassis, and desirably one well forward along the latter, and preferably one forward of the front wheel. The upper end of said element, conveniently a rope, is held in the hand of the rider. The upward pull on such rope required to lift the front of the vehicle for steering is not muscularly straining in the least; and this is especially so if the lower end of the rope is connected to the chassis at a point enough forward of the resting place on the chassis of the foot of the rider to impart a considerable leverage factor. As will be understood, such lifting of the front of the vehicle is for temporarily conditioning the same for steering, and while thus conditioned the vehicle is steered by a pull on the rope laterally of the vehicle. The skill which with a little practice can be developed, such skill exhibited by having the upward pull on the rope just that needed to have the front wheel barely clear the ground and by at the same time having the lateral pull on the rope just that needed to result in the change of direction desired, is quite remarkable.

The invention will be very clearly understood, from the following description, when taken in connection with the accompanying drawing, which drawing illustrates an embodiment of the invention as now preferred.

In said drawing.

Figures 1, 2, 3:
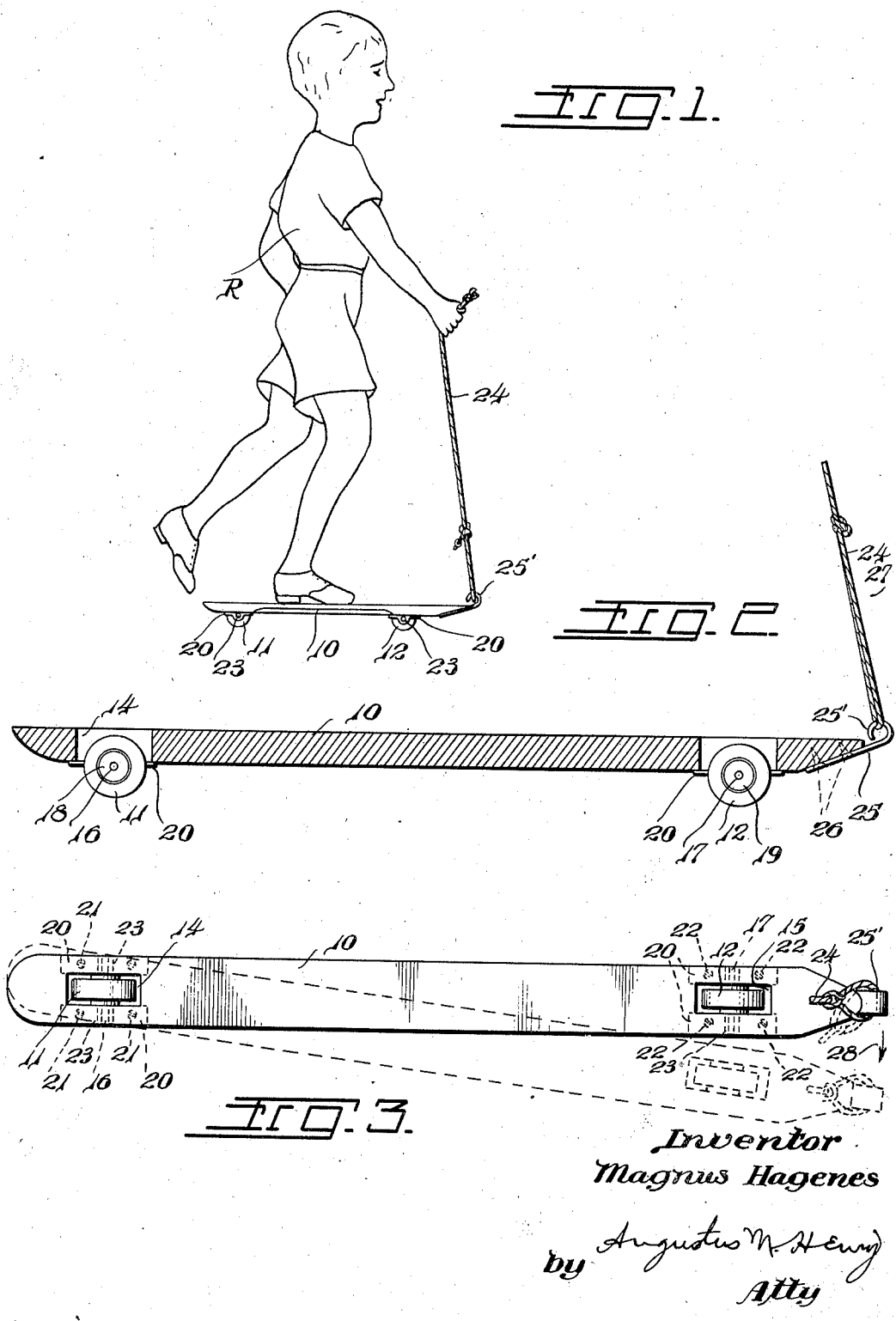
Fig. 1 shows such embodiment, in side elevation, and in use.
Fig. 2 shows said embodiment in central longitudinal vertical section.
Fig. 3 is a top plan view thereof.

The vehicle thus illustrated in exemplification of the invention, comprises a chassis or carriage 10 having a rear wheel 11 and a front wheel 12. The carriage 10 is in the present case shown as of considerable length, of small width as compared to its length, and as made of a single block of wood having well-like openings 14 and 15 therethrough, these openings for housing upper portions of the wheels 11 and 12; which wheels are shown as revoluble on axles 16 and 17.

The wheels 11 and 12 can be, and are shown as, ordinary roller-skate wheels, of the type incorporating ball-bearings as indicated at 18 and 19.

Also as the carriage 10 is shown, it has a flat top surface forward of the rear wheel 11, providing a platform on which the foot of the rider may rest. Desirably, and as shown, the wheels 11 and 12 are so placed on the carriage that the rear wheel 11 is near the rear end of the carriage, the front wheel 12 is some distance back from the front end of the carriage, and the distance between the two wheels is greater than the length of the rider's foot, so that the latter can be placed on said platform in a way to have the weight of the rider placed properly forward of the rear wheel and far enough back from the front wheel to be well in rear of the front end of the carriage.

While the features just described are merely preferred, it is an essential of the present invention, regardless of how the wheels are constructed and mounted for revolution on the carriage, and regardless of how the carriage is constructed as to material or materials, design and dimensions, that the front and rear wheels be so connected to the carriage that they are always revoluble about axes to hold the vehicle to straight-line travel while both wheels are on the ground. In the present case, this result is shown as being assured by employing four like stamped strip-metal plates 20, screwed in pairs as at 21 and 22 to the bottom of the carriage alongside the openings 14 and 15, and so as then to hold the opposite ends of the axles 16 and 17 seized tight between the bottom of the carriage and the plates, with these axle ends seated in transverse groove-formations 23 carried by the plates as illustrated.

The steering means of the invention is shown as an elongate flexible element in the form of a rope 24, with the lower end of such rope connected to the front end of the carriage by being tied to an eye-portion 25' of a strip-metal fitment 25 screwed as at 26 to the carriage bottom and shaped then to locate said eye-portion just ahead of the front end of the carriage.

In operation, either foot of the rider R is used as the propelling foot, in which case the rider balances himself upright on his other foot as the latter rests on the platform afforded by the flat top of the carriage 10 and in placement on said platform far enough back toward the rear wheel 11 to obtain a good leverage factor from that part of the length of the vehicle extending from below the center of gravity of the rider to the point of connection of the rope 24 to the front end of the vehicle. In Fig. 1, the rider R, a boy, is shown as using the vehicle while employing his left foot as the propelling foot.

Even in straight-ahead travel, there is a novel challenge to the balancing skill of the rider, as the rope 24 offers him no balancing aid whatever ordinarily, unlike the tiller above referred to or the upstanding post which he grasps in the scooter having a rubber-block mounted front wheel. As the rider's skill increases, he can utilize the rope 24 as somewhat of a balancing aid, but then, even while for this purpose he holds the rope taut, he must be careful that he never exerts such an upward pull thereon as will raise the front wheel too far off the ground.

As already pointed out, an upward pull on the rope 24, as indicated by the arrow 27 of Fig. 2, conditions the vehicle for steering by relieving ground grip on the front wheel 12, and a substantially simultaneous lateral pull on the rope, for instance such a pull to the right as indicated by the arrow 28 of Fig. 3, swings the front end of the carriage, as indicated in broken lines in this view, to change the direction of travel toward the right.

To steer to the right precisely as desired, a slight upward pull on the rope must be accompanied by just the required rightward pull on the rope; and to steer to the left precisely as desired, a slight upward pull on the rope must be accompanied by just the required leftward pull on the rope. In either such steering, the simultaneous body sway must be nicely adjusted to speed and degree of change of direction being effected by rope manipulation. There is here particularly a fascinatingly interesting problem in coordination between muscular action as applied to the rope pullingly thereof, and body balancing assisted by tautness of the rope.

Considerable particularities of description, as to present preferences and otherwise, have been herein indulged in, but it will be understood that these, made in connection with the exemplifying embodiment of the invention shown in the drawing, are not to be taken as definitive or delimitative of the invention. That is to say, the scope of protection contemplated is to be taken solely from the appended claims, interpreted as broadly as is consistent with the prior art.

I claim:

1. A scooter of the class described comprising a platform adapted to receive a standing occupant, ground engaging wheels respectively carried by an axle secured to the platform adjacent the front and rear ends thereof, said wheels being restrained thereby to rotate in a plane parallel to the longitudinal plane of the platform only and steering means connected at the lower end thereof to the front end of the platform forwardly of the front supporting wheel, said connection being of substantially universal character whereby a force exerted by said occupant on the upper end of the steering means in an upward and lateral direction relative to the longitudinal axis of the platform causes the forward end of said platform to move out of its course of travel without lateral tilting thereof.

2. A scooter as set forth in claim 1, characterized by said steering means comprising a flexible rope.

MAGNUS HAGENES.